Feb. 23, 1937.   J. K. DOUGLAS   2,071,781
HYDRAULIC TRANSMISSION
Filed April 2, 1936   4 Sheets-Sheet 1
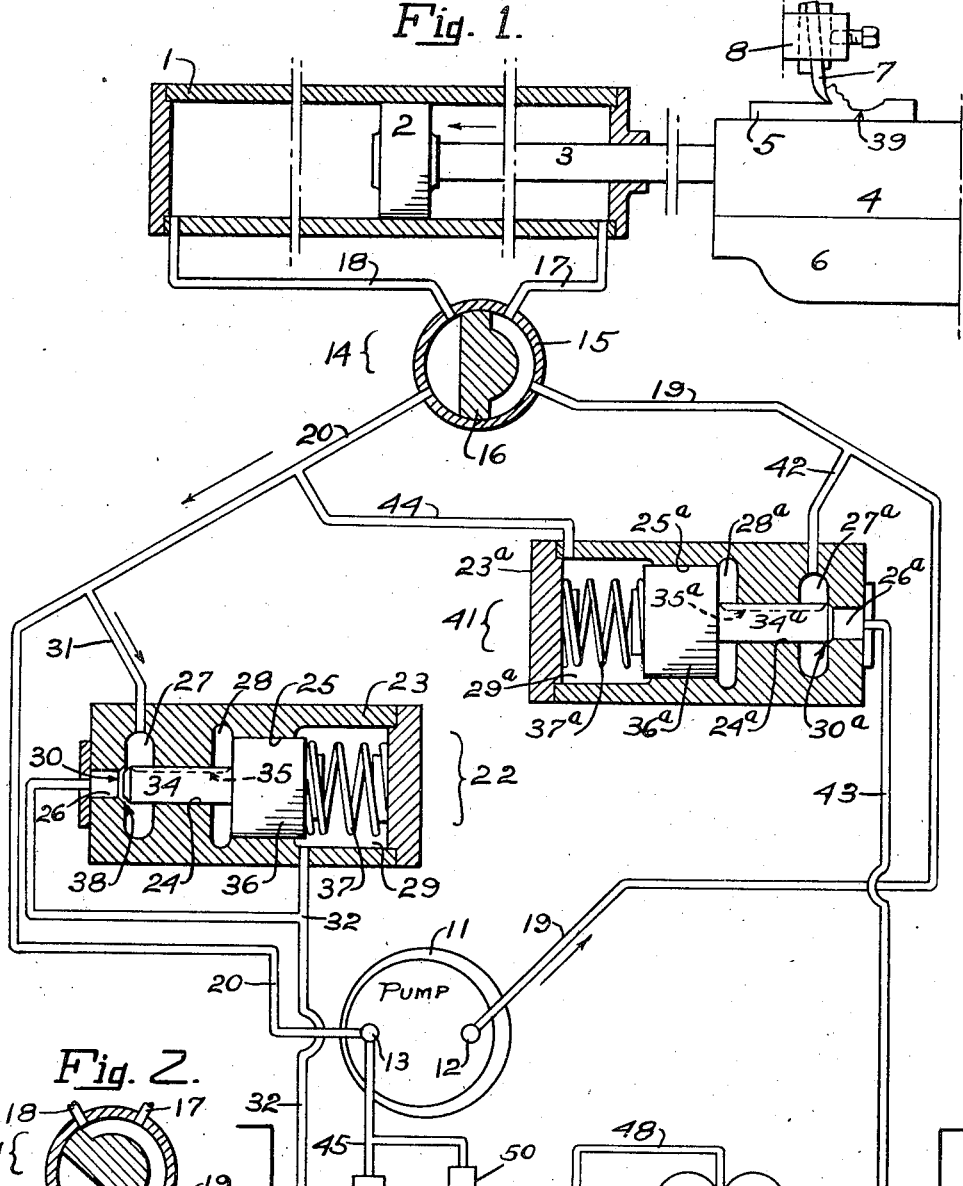
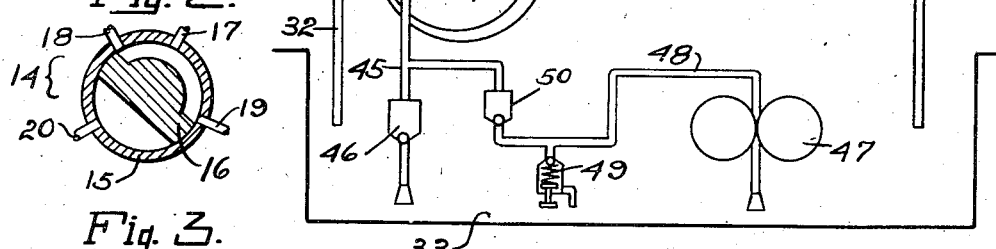
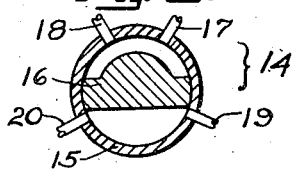
INVENTOR
JAMES K. DOUGLAS
BY
Wesley Merrill
ATTORNEY.

Feb. 23, 1937.  J. K. DOUGLAS  2,071,781
HYDRAULIC TRANSMISSION
Filed April 2, 1936  4 Sheets-Sheet 4

INVENTOR
JAMES K. DOUGLAS
BY
ATTORNEY.

Patented Feb. 23, 1937

2,071,781

UNITED STATES PATENT OFFICE 2,071,781

HYDRAULIC TRANSMISSION

James K. Douglas, Shorewood, Wis., assignor to The Oilgear Company, Milwaukee, Wis., a corporation of Wisconsin Application April 2, 1936, Serial No. 72,229

20 Claims. (Cl. 60—52)

This invention relates to hydraulic transmissions of the type employed to move a load which may at times abruptly vary through a wide range and which should be moved at a uniform rate of speed.

For example, the transmission may be employed to drive the carriage of a machine tool to produce relative movement between a cutting tool and a piece or pieces of work which may be of such character that the cutting tool either makes interrupted cuts or at times passes abruptly from a heavy cut into a very light cut. When the tool meets a heavy cut, the pressure of the liquid delivered to the motor of the transmission rises to a value proportional to the tool resistance with the result that the driving liquid, which is usually a good grade of lubricating oil, is compressed. Then, when the tool passes abruptly out of the heavy cut, the compressed oil expands and drives the carriage forward at high speed, thereby producing a phenomenon known as "table jump" and resulting in unsatisfactory work.

The present invention has as an object to provide a hydraulic transmission having means for preventing an abrupt change in load from causing a material variation in the speed at which the load is moved.

Another object is to provide a hydraulic transmission which will reciprocate the table of a machine tool and stop the table from jumping substantially at the same instant that it starts to jump.

Other objects and advantages will be apparent from the description hereinafter given of several transmissions in which the invention is embodied.

Table jump may be reduced by maintaining a back pressure upon the motor, and it may be stopped at its inception by suddenly raising the back pressure in response to the jump.

It has long been common practice to maintain back pressure on a motor by forcing the liquid exhausted therefrom through a relief valve but, due to undue waste of power and heating of the oil, it is not practical to maintain by this method a back pressure high enough to keep the table jump within the bounds necessary for certain classes of work.

In order to avoid large power losses and excessive heating of the oil, it has been proposed that the liquid discharged from the motor shall be in part returned direct to the intake of the pump and in part exhausted through a relief valve, but this method may be used only with a differential reciprocating motor that pulls its load, that is, a motor which during its working stroke discharges liquid at a rate greater than the rate at which the driving liquid is delivered thereto. Also, the back pressure is limited by the resistance of the relief valve and remains substantially constant regardless of the amount of table jump.

It has also been proposed to vary the back pressure inversely to variations in pump pressure. This is accomplished by inserting a throttle valve in the motor discharge line and varying the opening therethrough in response to variations in pump pressure. This method necessitates throttling all of the discharged liquid with the resultant power loss and heating of the oil. Also, if pump pressure varies rapidly, chattering may result.

The above objectionable characteristics are overcome in the present invention which contemplates the use of an orifice choke in the motor discharge line. Since the drop in pressure across an orifice varies substantially in accordance with the square of the velocity of the liquid flowing therethrough, it is possible to obtain a very high momentary back pressure which effectually stops the jump and then the back pressure instantly drops to its predetermined value. For example, if the table should tend to jump forward at twice its normal speed, twice as much liquid would try to flow through the orifice with the result that the back pressure would be increased to four times its normal value. It is therefore possible to maintain a normal back pressure which is much lower than the back pressure necessary in the prior transmissions.

If a fixed orifice were employed, the motor could be operated efficiently only at one speed for the reason that a higher speed would cause too high a back pressure to be created, and a sufficiently high back pressure would not be created at a lower speed. If a manually adjustable orifice were employed, the average operator would not have the necessary skill to adjust it properly when changing the speed of the motor. Therefore, the present invention is provided with a self-adjusting orifice choke which is operated by the back pressure to maintain the back pressure at a predetermined value and which has its action delayed so that a momentary high back pressure may be created in response to table jump.

If the entire motor discharge is forced through the orifice, power loss and heating will result but will be considerably less than in the prior transmission due to the lower back pressure employed. In order to avoid a large part of the power loss and heating, the present invention contemplates the use of a substantially closed differential circuit, that is, a hydraulic circuit in which the motor delivers liquid direct to the intake of the pump but discharges liquid in at least one direction of motor actuation at a rate greater than the rate at which the pump can receive liquid from the motor. This may be accomplished by employing a differential motor, a differential pump, or both.

The liquid discharged by the motor is in part returned direct to the pump and in part exhausted through an orifice choke so that a much higher back pressure is created in response to table jump than can be created when the entire motor discharge is exhausted through an orifice choke. For example, if the table should jump forward at twice its normal speed and if all of the liquid discharge by the motor should be forced through the orifice choke, the back pressure would be raised to four times its normal value as previously explained. But, if the transmission were so proportioned that one half of the liquid discharged by the motor should be returned direct to the pump and the other half thereof forced through an orifice choke, and if the table tended to jump forward at twice the adjusted speed, two extra units of oil would have to flow through the orifice, thereby increasing the flow through the orifice to three times its normal velocity and causing the back pressure to be increased to nine times its normal value. Therefore, any table jump or sudden increase in motor speed is promptly checked at its inception.

The invention is exemplified by the transmissions shown schematically in the accompanying drawings in which the views are as follows:

Fig. 1 is a diagram of the hydraulic circuit of a hydraulic transmission which includes a non-differential pump and a differential motor, the several parts being shown in the positions occupied during a working stroke of the motor.

Fig. 2 is a view showing the reversing valve illustrated in Fig. 1 shifted to a position to cause reversal of the motor.

Fig. 3 is a view showing the reversing valve shifted to a position to short circuit the pump and thereby stop the motor.

Figure 4:
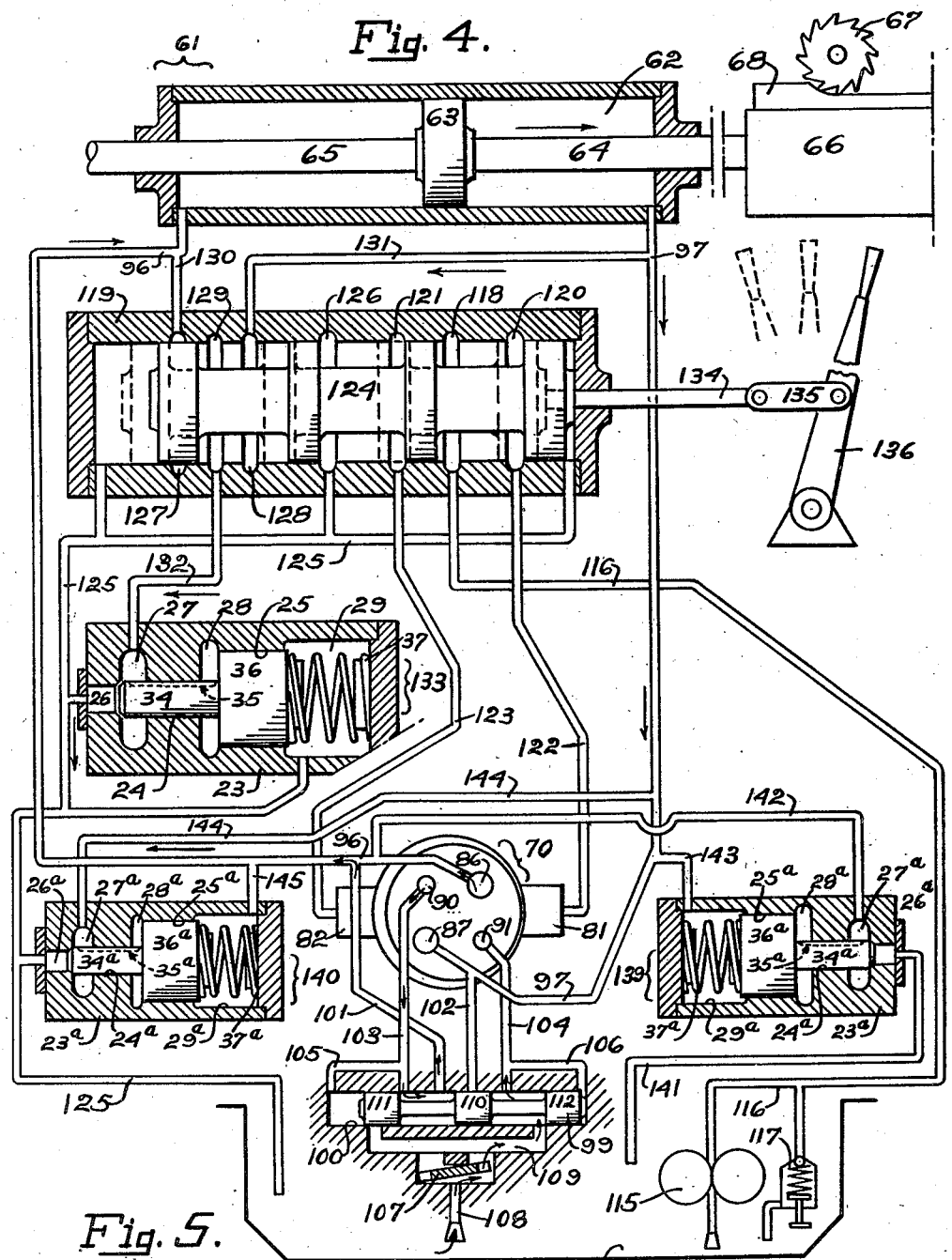
Fig. 4 is a diagram of the hydraulic circuit of a hydraulic transmission which includes a reversible differential pump and a non-differential motor, the several parts being shown in the positions occupied during a working stroke of the motor.

While but three forms of the invention are shown, it is to be understood that other forms may be readily produced as, for instance, by interchanging parts of the transmission shown.

Figs. 1 to 3

The transmission is shown in Fig. 1 as being provided with a reciprocating hydraulic motor for operating a machine tool to produce relative movement between a cutting tool and a piece of work. In respect to the present invention, either the tool or the work may be moved and the other fixed in a stationary position, and either the motor cylinder or the motor piston may be fixed in a stationary position and the other connected to the movable part of the machine.

As shown, the motor has its cylinder 1 arranged in a stationary position and its piston 2 fitted in cylinder 1 and connected by a piston rod 3 to a work table 4 having a piece of work 5 fixed thereon. Table 4 forms part of a planer 6 which has not been illustrated in detail for the reason that it forms no part of the present invention. The motor is adapted to reciprocate table 4 to move work 5 relative to a cutting tool 7 arranged in a stationary tool holder 8 which forms a part of planer 6.

Rod 3 extends from one end only of piston 2 through the right end only of cylinder 1 so that the right end of piston 2 has a smaller effective pressure area than the left end thereof and the right end of cylinder 1 has a smaller displacement or volumetric capacity than the left end thereof due to the displacement of rod 3.

Liquid for operating the motor is supplied by a non-differential pump 11 of any suitable type, such as the pump disclosed in Patent No. 1,998,984. Pump 11 delivers its output through a discharge port 12 and receives its supply of liquid through an intake port 13.

The delivery of liquid to the motor is controlled by a reversing valve 14 which, in practice, is ordinarily of the piston or reciprocating type but which, for simplicity in illustration, has been shown as a rotary valve having a stationary casing 15 and a rotary valve member 16 fitted therein. Valve casing 15 is connected to opposite ends of cylinder 1 by two channels 17 and 18, respectively, and to the ports 12 and 13 of pump 11 by two channels 19 and 20 respectively.

When valve member 16 is in the position shown in Fig. 1 and pump 11 is in operation, liquid will flow from pump 11 through channel 19, valve casing 15 and channel 17 to the right end of cylinder 1 and force piston 2 toward the left on a working stroke, and piston 2 will force liquid from the left end of cylinder 1 through channel 18, valve casing 15 and channel 20 to intake port 13, thereby supercharging pump 11.

Since the left end of cylinder 1 has a greater displacement than the right end thereof due to the displacement of rod 3, the volume of liquid discharged from cylinder 1 is greater than the volume delivered thereto by pump 11 and is consequently greater than the intake capacity of the pump 11.

Liquid discharged from cylinder 1 in excess of pump requirements is exhausted through an anti-jump valve 22 which has its mechanism arranged within a casing 23 having an axial bore 24 and a counterbore 25 formed therein concentric with each other. Casing 23 also has an exit port 26 formed in the front end thereof in alinement with bore 24, and inlet port 27 arranged between port 26 and the front end of bore 24, a pressure chamber 28 arranged between counterbore 25 and the rear end of bore 24, and a spring chamber 29 arranged at the rear end of counterbore 25.

Inlet port 27 has a valve seat 30 arranged around its inner end and its outer end connected by a channel 31 to channel 20 intermediate the ends thereof. Exit port 26 is connected to a drain channel 32 which discharges into a reservoir 33 and is also connected to spring chamber 29 to prevent any fluid from being trapped therein.

Bore 24 has fitted therein a valve member 34 which controls communication between ports 26 and 27 and which has a small groove 35 formed longitudinally thereof to provide restricted communication between port 27 and pressure chamber 28. Valve member 34 is fixed at its rear end to a piston 36 which is fitted in counterbore 25 and urged forward by a spring 37 arranged in spring chamber 29.

Spring 37, which is either selected to exert the desired force upon piston 36 or is provided with means for adjusting its tension, tends to hold the forward end of valve member 34 against valve seat 30 to close communication between ports 27 and 26, thereby causing a back pressure on piston 2 due to the fact that piston 2 is expelling more liquid from cylinder 1 than pump 11 can receive.

The back pressure will rise until the force exerted by the liquid upon the front end of piston 36 overcomes the resistance of spring 37 and then liquid will flow slowly through groove 35 and force piston 36 rearward, thereby moving valve member 34 out of engagement with valve seat 30 and forming therebetween an orifice 38 through which liquid may escape from channel 20 into drain channel 32.

The liquid acting upon piston 36 will continue to move it rearward to adjust the width of orifice 38 until the drop in pressure across orifice 38 is just equal to the pressure required to balance the force exerted upon piston 36 by spring 37. There will thus be created in the left end of cylinder 1 a back pressure which will remain constant as long as piston 2 moves toward the left at a uniform speed.

When piston 2 moves table 4 toward the left and causes tool 7 to take a cut from work 5, pump 11 will create a pressure proportional to the resistance of work 5 to the action of tool 7, thereby compressing the liquid in the right end of cylinder 1. Then if tool 7 should suddenly break out of a heavy cut, as by running into a thin part of the work such as that indicated at 39, the tool resistance would suddenly drop and, if no preventative means were provided, the compressed liquid in the right end of cylinder 1 would expand and cause piston 2 to jump forward and expel liquid from the left end of cylinder 1 at a greatly increased rate.

Since pump 11 continues to operate at the same speed and therefore continues to require liquid at the normal rate, any additional liquid expelled from cylinder 1 due to the jump must flow through orifice 38, thereby greatly increasing the rate at which liquid tends to flow through orifice 38. Groove 35 has such a small cross sectional area that enough liquid cannot flow therethrough during the jump to have any material effect upon the size of orifice 38. Therefore, since the drop in pressure across an orifice is substantially proportional to the square of the velocity of the liquid flowing therethrough, there is instantly created a very high back pressure which effectively stops the jump at its inception.

The pressure created by pump 11 is limited to a predetermined maximum by a relief valve as is customary. If an ordinary relief valve were employed and if the operator of the machine should attempt to take such a heavy cut that a pressure higher than the predetermined maximum would be required to overcome both the back pressure and the resistance of the work, pump 11 would discharge through the relief valve and the motor would stall. Pump 11 however would continue to draw liquid from the left end of cylinder 1 and would almost instantly reduce the pressure therein enough to permit piston 2 to be moved by a pressure not exceeding the predetermined maximum. Then the relief valve would close and the piston 2 would surge forward until it had created sufficient back pressure to cause it to stall again. The machine would continue to operate in this spasmodic manner until the tool broke out of the heavy cut or some machine part gave way or until the operator corrected the condition.

In order to avoid all danger of the machine continuing to operate under an overload, the present invention provides the transmission with a relief valve 41 which is substantially of the same construction as anti-jump valve 22. Consequently, no detailed description thereof will be given and the reference numerals applied to the several parts of anti-jump valve 22 have been applied to the corresponding parts of relief valve 41 but with the exponent "a" added.

There are two essential differences between valves 22 and 41. First, groove 35$^a$ in the valve member 34$^a$ of relief valve 41 is larger than the groove 35 of valve 22 in order that the relief valve may open and close promptly, but it is small enough to limit the flow therethrough sufficiently to prevent the relief valve from chattering. Second, piston 35$^a$ is urged forward against the pressure in chamber 28$^a$ by the back pressure as well as by spring 37$^a$.

Relief valve 41 has its inlet port 27$^a$ connected by a channel 42 to channel 19 intermediate the ends thereof and its exit port 26$^a$ connected to a drain channel 43 which discharges into reservoir 33. Spring chamber 29$^a$ is connected by channel 44 to channel 20 so that the back pressure prevailing in the left end of cylinder 1 acts upon piston 36$^a$ and assists spring 37$^a$ to hold valve member 34$^a$ against its seat 30$^a$.

When pump pressure exceeds the predetermined maximum, liquid will flow through groove 35$^a$ and force piston 36$^a$ rearward and thereby move valve member 34$^a$ away from seat 30$^a$ to permit pump 11 to discharge into drain pipe 43 so that the motor stalls. Pump 11 almost instantly reduces the pressure in channel 20 and thereby reduces the force which tends to close the relief valve. Therefore, the relief valve will remain open and the motor will remain idle until the operator corrects the condition that caused the motor to stall.

In order for relief valve 41 to function efficiently under all conditions of operation, the cross sectional area of valve member 34$^a$ should bear the same relation to the cross sectional area of piston 36$^a$ that the cross sectional area of piston rod 3 bears to the cross sectional area of piston 2.

When it is desired to reverse the motor, reversing valve 14 is operated to shift valve member 16 from the position shown in Fig. 1 to the position shown in Fig. 2, thereby blocking channel 20 and connecting channel 19 to both of channels 17 and 18 so that both ends of piston 2 are subjected to pump pressure. Since piston 2 has a greater effective pressure area upon its left end than upon its right end, it will be forced toward the right and expel liquid from the right end of cylinder 1 through pipe 17, valve casing 15 and pipe 18 to the left end of cylinder 1. Consequently, pump 11 need supply only a volume of liquid equal to the displacement of rod 3 so that piston 2 and table 4 are moved toward the right at high speed.

During the reversal of the motor, no liquid is returned therefrom to pump 11 which must receive its supply from some other source such as reservoir 33. This may be accomplished by connecting to intake port 13 a suction channel 45 which extends into reservoir 33 and through which pump 11 may draw its supply of liquid, channel 45 having check valve 46 arranged therein to prevent liquid from being exhausted from the left end of cylinder 1 into reservoir 33 during the working stroke of the motor.

It is common practice to provide a power pump with an auxiliary gear pump which is driven in unison with the main pump and arranged in the casing thereof, the output of the gear pump being employed for control purposes, for supercharging the main pump, or for both.

The transmission is shown provided with a gear pump 47 which draws liquid from reservoir 33 and discharges it into a low pressure supply channel 48 having a low pressure relief valve 49 connected thereto to limit the pressure created by gear pump 47. Supply channel 48 may be connected to port 13, as by being connected to suction pipe 45 above check valve 46, so that gear pump 47 will supply liquid to pump 11 when insufficient liquid is being returned thereto from cylinder 1, a check valve 50 being arranged in channel 48 to prevent liquid from being exhausted through low pressure relief valve 49 during the working stroke of the motor. While two methods of supplying liquid from reservoir 33 to pump 11 have been shown, only one is necessary.

When it is desired to stop the motor, reversing valve 14 is operated to shift valve member 16 to the position shown in Fig. 3, thereby interrupting the delivery of liquid to the motor to stop it and at the same time connecting channel 19 to channel 20 so that all liquid discharged by pump 11 simply circulates through channel 19, valve casing 15 and channel 20 back to pump 11 and the motor remains idle.

Figure 5:
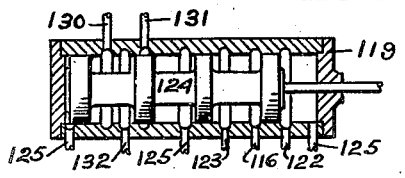
Fig. 5 is a view showing the reversing valve illustrated in Fig. 4 shifted to a position to cause reversal of the motor.
Figure 6:
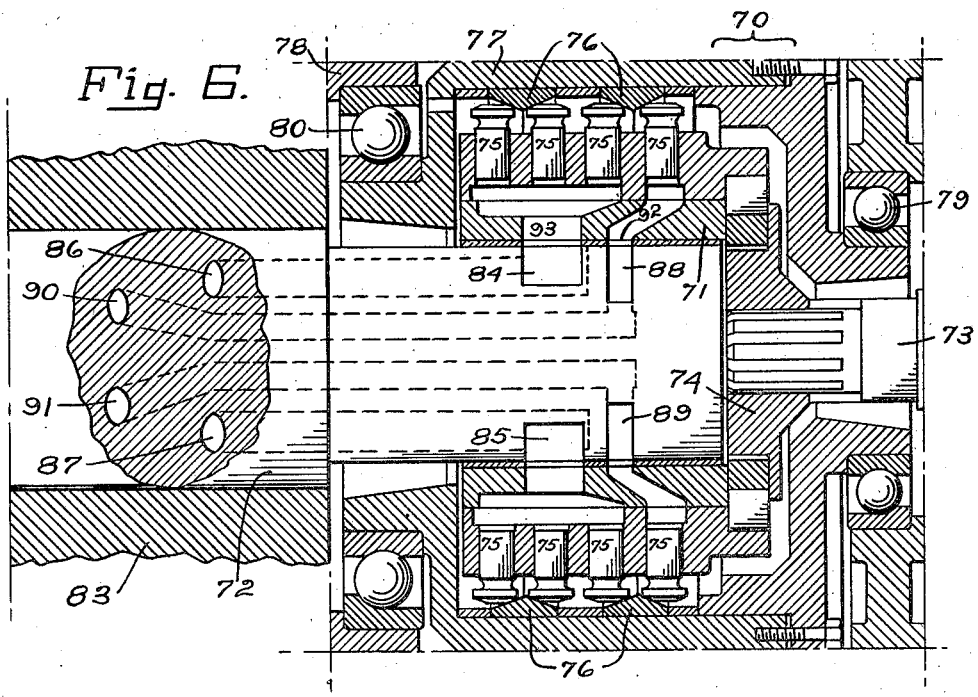
Fig. 6 is a view showing certain essential details of the pump employed in the transmission illustrated in Fig. 4.

*Figs. 4 to 6*

The transmission shown in Fig. 4 is provided with a non-differential motor 61 which has its cylinder 62 arranged in a stationary position and its piston 63 fitted in cylinder 62 and provided with two piston rods 64 and 65 which are equal in cross sectional area and extend through opposite ends of cylinder 62. Rod 64 is shown connected to the work table 66 of a milling machine the milling cutter 67 of which is adapted to operate upon a piece of work 68 fixed upon table 66.

Liquid for operating motor 61 is supplied by a reversible differential pump 70 which is so constructed and connected in circuit with motor 61 that it delivers more liquid to motor 61 than it receives therefrom. A pump which may be employed is illustrated and described in application Serial No. 74,740, filed April 16, 1936.

The characteristics which differentiate pump 70 from a standard or non-differential pump are illustrated in Fig. 6 in which the pump is shown provided with a rotatable cylinder barrel 71 which is journaled upon a stationary valve shaft of pintle 72 and has its cylinders arranged radially in four circular rows. Cylinder barrel 71 is rotated upon pintle 72 by a drive shaft 73 which is connected to cylinder barrel 71 by means of a driver 74 and has its inner end journaled in the end of pintle 72.

Each cylinder has a piston 75 fitted therein and provided at its outer end with an enlarged head which is engaged by a beveled thrust ring 76 at one side of the piston axis. Thrust rings 76 are fixed inside a rotatable thrust member 77 which is arranged inside a non-rotatable cradle 78 and supported by bearings 79 and 80 carried thereby. When the pump is delivering liquid, the frictional contact between pistons 75 and thrust rings 76 will cause thrust member 77 to rotate in unison with cylinder barrel 71 but upon an axis that is offset from the cylinder barrel axis. Direction of pump delivery may be changed by moving cradle 78, to shift the axis of thrust member 77 from one side of the cylinder barrel axis to the other side thereof, as by means of the two hydraulic servo-motors 81 and 82 shown schematically in Fig. 4.

Pintle 72 is fixed at its rear end in a pump casing or other support 83 and is provided near its other end with a pair of diametrically opposed segmental ports 84 and 85 which communicate, respectively, with two passages 86 and 87 formed in the pintle longitudinally thereof. Pintle 72 is also provided with another pair of opposed ports 88 and 89 which are arranged alongside but spaced from ports 84 and 85 and which communicate, respectively, with two passages 90 and 91 formed in the pintle longitudinally thereof.

The arrangement is such that one group of cylinders delivers liquid to motor 61 through one of ports 84 and 85 and receives liquid from motor 61 through the other one of ports 84 and 85, and another group of cylinders delivers liquid to motor 61 through one of ports 88 and 89 and receives liquid from a separate source through the other one of ports 88 and 89 so that pump 70 delivers more liquid to motor 61 than it receives therefrom.

The pump is shown as being so constructed that, when cylinder barrel 71 rotates, the cylinders in the front row communicate through a plurality of ports 92 with pintle ports 88 and 89 alternately, and the cylinders in the other three rows communicate through a plurality of ports 93 with pintle ports 84 and 85 alternately. Cylinders barrel 71 is provided with as many ports 92 as there are cylinders in the front row and with as many ports 93 as there are cylinders in each of the other three rows. Each port 92 is connected to one cylinder while each port 93 is connected to one cylinder in each of three rows or to a total of three cylinders.

Pump 70 may deliver liquid to motor 61 through either a channel 96 or a channel 97 which connect passages 86 and 87, respectively, to opposite ends of cylinder 62 as shown in Fig. 4. The three rear rows of cylinders may receive liquid from motor 61 through either channel 96 or channel 97, and the front row of cylinders may receive its supply of liquid from a reservoir 98 arranged in the lower part of the pump casing.

The delivery of liquid to the front row of cylinders is controlled by a surge valve 99 fitted in a cylinder 100 which may be formed in the pump casing. Channels 96 and 97 are connected, respectively, by two branch channels 101 and 102 to cylinder 100 at two spaced apart points near the center thereof. Pintle passages 90 and 91 are connected, respectively, by two channels 103 and 104 to cylinder 100 at opposite sides of channels 101 and 102. The ends of cylinder 100 are connected to channels 103 and 104, respectively, by branch channels 105 and 106 through which liquid may flow for shifting surge valve 99 as will be presently explained.

A check valve 107 has its inlet connected to a suction channel 108, which extends into the liquid in reservoir 98, and its outlet connected to a channel 109 one end of which is connected to cylinder 100 between channels 103 and 105 and the other end of which is connected to cylinder 100 between channels 104 and 106.

Surge valve 109 is provided with a center head or piston 110 and two end heads or pistons 111 and 112 which are spaced therefrom. Piston 110 controls communication between channel 102 and channels 101 and 104, piston 111 controls communication between channel 103 and the left end of channel 109, and piston 112 controls communication between channel 104 and the right end of channel 109.

When the pump is adjusted to deliver through passages 86 and 90, the liquid discharged from the three rear rows of cylinders will flow through passage 86 and channel 96 to the left end of cylinder 61, the liquid discharged from the front row of cylinders will flow through passage 90, channel 103, cylinder 100 and channels 101 and 96 to the left end of cylinder 61, and pressure will extend from channel 103 through channel 105 to the left end of cylinder 100 and hold surge valve 99 to the right in which position piston 110 blocks passage 102 so that liquid may be returned from motor 61 through channel 97 and passage 87 to the three rear rows of cylinders. At the same time, the pistons in the front row are drawing liquid into their cylinders from reservoir 98 through suction channel 108, check valve 107, channel 109, cylinder 100, channel 104 and passage 91.

When the pump is reversed so that it delivers through passages 87 and 91, the liquid discharged from the three rear rows of cylinders will flow through passage 87 and channel 97 to the right end of cylinder 61, and the liquid discharged from the front row of cylinders will flow through passage 91, channels 104 and 106 and shift surge valve 99 toward the left until piston 111 strikes the end of cylinder 100 at which time piston 110 has uncovered the end of channel 102 and blocked the end of channel 101, piston 111 has uncovered the left end of channel 109 and piston 112 has covered the right end of channel 109. Liquid discharged by the front row of cylinders may then flow through channel 104, cylinder 100 and channels 102 and 97 to the right end of cylinder 61.

Pump 70 may be reversed by supplying liquid to one or the other of two servo-motors 81 and 82 from any suitable source such as a gear pump 115 which may draw its supply of liquid from reservoir 98 and be driven in unison with pump 70 according to the common practice.

Gear pump 115 discharges into a low pressure supply channel 116 having connected thereto a low pressure relief valve 117 which limits the pressure created by the gear pump and through which liquid discharged by the gear pump in excess of requirements is exhausted into reservoir 98. Channel 116 is connected to a port 118 formed in a reversing valve casing 119 which has two other ports 120 and 121 formed therein upon opposite sides of port 118 and connected, respectively, to servo-motors 81 and 82 by channels 122 and 123.

The flow of liquid through valve casing 119 is controlled by a reversing valve 124 which is closely fitted therein and adapted to connect either channel 122 or 123 to supply pipe 116 or to a drain channel 125 which discharges into reservoir 98 and is connected to both ends of casing 119 and to a port 126 formed therein at the left of port 121.

Valve 124 also controls communication between three ports 127, 128 and 129 which are formed in casing 119 at the left of port 126. Ports 127 and 128 are connected to channels 96 and 97, respectively, by two channels 130 and 131. Port 129 is arranged between ports 127 and 128 and connected by a channel 132 to the inlet port 27 of an anti-jump valve 133 which has its exit port 26 and its spring chamber 29 connected to drain channel 125. Since anti-jump valve 133 is exactly the same as the anti-jump valve 22 shown in Fig. 1 and previously described, like parts have been indicated by like reference numerals and no further description thereof will be given.

When reversing valve 124 is shifted to the position shown in full lines in Fig. 4, gear pump 115 will deliver liquid through channel 116, valve casing 119 and channel 122 to servo-motor 81 which will shift cradle 78 of pump 70 toward the left and cause pump 70 to discharge the output of all four rows of cylinders through passages 86 and 90 and the channels previously described to the left end of cylinder 61 and thereby cause piston 63 to move toward the right on a working stroke and expel liquid from the right end of cylinder 61 into channel 97.

Piston 63 will tend to deliver to pump 70 the entire volume expelled from cylinder 61 but, since pintle port 85 has no connection with the front row of cylinders in cylinder barrel 71, liquid is expelled from cylinder 61 in excess of the volume that can be taken by the cylinders in the three rear rows. This excess liquid is expelled through channel 131, valve casing 119, channel 132, anti-jump valve 133 and drain channel 125 into reservoir 98. Anti-jump valve 133 functions to maintain a predetermined normal back pressure on motor 61 and to cause a very high back pressure to be instantly created in response to table jump to stop the jump at its inception as previously explained.

Valve 124 may be shifted to reverse motor 61 either in response to table 66 reaching a predetermined point in its travel as is common practice or it may be shifted by hand. As shown, it has its stem 134 connected by a pair of links 135 to a hand lever 136 by means of which it may be shifted.

When valve 124 is shifted toward the left to the position shown in Fig. 5, liquid from gear pump 115 may flow through channel 116, valve casing 119 and channel 123 to servo-motor 82 and reverse pump 70, liquid being exhausted from servo-motor 81 through channel 122 and casing 119 into drain channel 125. The liquid discharged from the three rear rows of pump cylinders will then flow through channel 97 to the right end of cylinder 61, and the liquid discharged from the front row of cylinders will flow through channels 104 and 106 to the right end of cylinder 100 and shift surge valve 99 toward the left and it will then flow through cylinder 100 and channels 102 and 97 to the right end of cylinder 61 so that piston 63 is forced toward the left by the entire output of pump 70.

Piston 63 will expel into channel 96 a volume of liquid practically equal to the entire volume discharged by pump 70. Enough of this liquid to supply the pump cylinders in the three rear rows will flow thereto through channel 96 and passage 86 and the remainder will be expelled through channel 130, valve casing 119, channel 132 and anti-jump valve 133 into drain channel 125. The pump pistons in the front row will draw liquid into their cylinders from reservoir 98 through suction channel 108, check valve 107, channel 109, cylinder 100, channel 103 and passage 90.

The transmission thus functions in exactly the same manner in either direction of motor actuation which is advantageous in the case of milling machines which are often required to operate upon work in either or both directions of table movement.

The pressure created by pump 70 is limited by two high pressure relief valves 139 and 140 which are exactly the same and function in exactly the same manner as the high pressure relief valve 41 previously described. Consequently, like parts thereof have been indicated by like reference numerals and no detailed description thereof will be given.

Relief valve 139 has its exit port 26ª connected to a drain channel 141 which discharges into reservoir 98, its inlet port 27ª connected by a channel 142 to channel 96 and its spring chamber 29ª connected by a channel 143 to channel 97 so that, when pump 70 is delivering into channel 96, the back pressure prevailing in channel 97 assists spring 37ª in holding the valve closed against the pressure created by pump 70 in channel 96.

Relief valve 140 has its exit port 26ª connected to drain channel 125, its inlet port 27ª connected by a channel 144 to channel 97 and its spring chamber 29ª connected by a channel 145 to channel 96 so that, when pump 70 is delivering into channel 97, the back pressure prevailing in channel 96 assists spring 37ª in holding the valve closed against the pressure created by pump 70 in channel 97.

If it is desired to stop motor 61 without stopping pump 70, valve 124 may be shifted to an intermediate position as indicated in dotted lines in Fig. 4 in which position port 127 is open to port 128 so that the intake and discharge ports of pump 70 are open to each other through channels 96 and 130, valve casing 119 and channels 131 and 97 and pump 70 may circulate liquid therethrough in either direction depending upon the direction of pump delivery.

*Figs. 7 to 10*

The transmission shown in these figures is provided with a differential motor 150 having its cylinder 151 arranged in a stationary position and its piston 152 provided with a single piston rod 153 which extends through one end only of cylinder 151. For the purpose of illustration, rod 153 is shown as having a relatively large cross sectional area and motor 150 is shown as being adapted to push its load instead of pulling it as is the case with the motor shown in Fig. 1.

Figure 10:
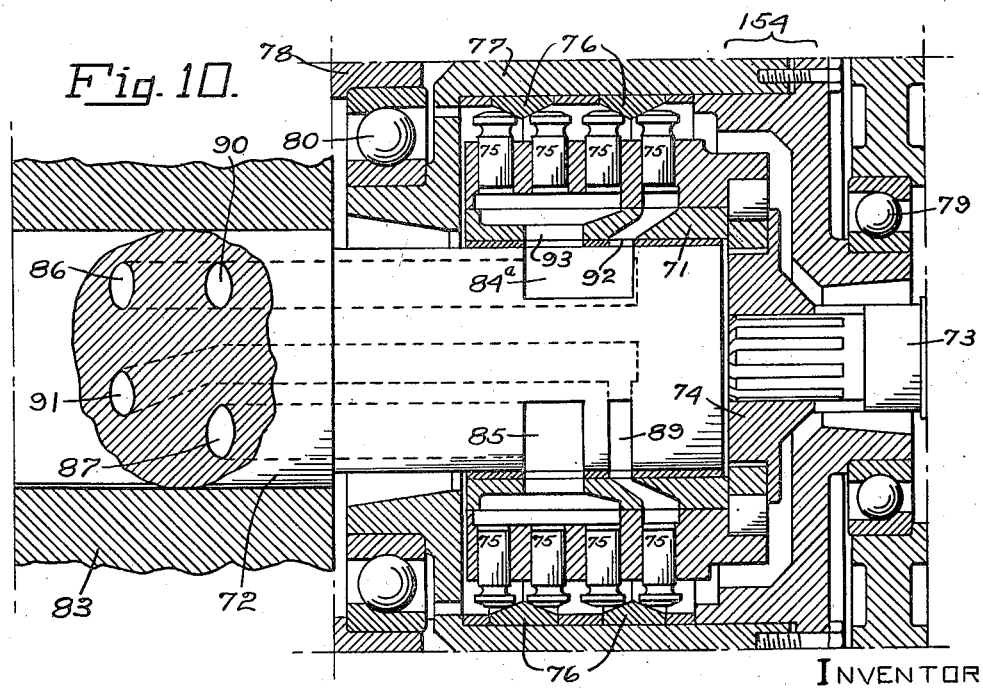
Fig. 10 is a view showing certain essential details of the pump employed in the transmission illustrated in Figs. 7 and 8.

Liquid for operating motor 150 is supplied by a non-reversible differential pump 154 which is so constructed and connected in circuit that it delivers more liquid to motor 150 than it receives therefrom. For the purpose of illustration, pump 154 is shown in Fig. 10 as differing from pump 70 in that it is non-reversible and all of its cylinders discharge into a single pintle port. Since the two pumps are otherwise substantially identical, like parts thereof have been indicated by like reference numerals and no detailed description thereof will be given. It is deemed sufficient to state that pump 154 has both of its upper pintle passages 86 and 90 connected at the outer ends thereof to a single discharge channel 155 and at the inner ends thereof to a single discharge port 84ª which is wide enough to permit both of the cylinder ports 92 and 93 to communicate therewith so that all of the pump cylinders discharge at all times into channel 155.

Since, due to the large displacement of rod 153, the volume discharged from motor 150 during a working stroke is only a fraction of the volume delivered thereto by pump 154, a large volume of liquid must be supplied to pump 154 from a separate source such as a reservoir 156. Consequently, pump 154 has its front row of cylinders supplied with liquid from motor 150 through a return channel 157, which is connected to pintle passage 91, and its three rear rows of cylinders supplied with liquid from reservoir 156 through a suction channel 158 which is connected to pintle passage 87 and has a check valve 159 arranged therein.

Operation of motor 150 is controlled by a reversing valve 161 fitted in a valve casing 162 to which channel 157 is connected. Delivery of liquid from pump 154 to reversing valve 161 is controlled by a start and stop valve 163 fitted in a valve casing 164 to which channel 155 is connected. For simplicity in illustration, valves 161 and 163 have been shown as rotary valves but in practice reciprocating valves are preferably employed.

Valve casing 164 is connected by a channel 165 to valve casing 162, by a channel 166 to return channel 157 intermediate the ends thereof, and by a channel 167 to a drain channel 168 which discharges into reservoir 156. When valve 163 is in the position shown in Figs. 7 and 8, pump 154 will deliver liquid through channel 155, valve casing 164 and channel 165 to valve casing 162 and thence to motor 150 to operate the same. In order to prevent motor 150 from operating, valve 163 may be shifted to the position shown in Fig. 9, in which position channel 165 is blocked and channel 155 is open to channels 166 and 167 so that pump 154 is short circuited, that is, a part of the liquid discharged by pump 154 into channel 155 will flow through channels 166 and 157 to passage 91 to supply the front row of the pump cylinders and the remainder of the liquid will be exhausted through channels 167 and 168 into reservoir 156.

Reversing valve 161 is adapted to direct liquid from pump 154 to motor 150 through either of two channels 170 and 171 which connect valve casing 162 to opposite ends of cylinder 151. Liquid exhausted from motor 150 is directed by valve 161 either into return channel 157 or into both return channel 157 and an exhaust channel 172 having arranged therein a resistance valve 173 which will open at a low pressure, for instance, 10 pounds per square inch. As shown, channel 172 connects casing 162 to channel 167.

In order to maintain a back pressure on piston 152 during a working stroke and to prevent it from jumping forward in response to a sudden increase in the load being moved thereby, an anti-jump valve 175 is connected to return channel 157 and rod 153 is so proportioned that the liquid expelled from the rod end of cylinder 151 during a working stroke of motor 150 is somewhat greater than the volume required to supply the front row of cylinders in pump 154.

Since anti-jump valve 175 is constructed and functions in exactly the same manner as anti-jump valve 22, like parts have been indicated by like reference numerals and no further description thereof will be given. It is deemed sufficient to state that its inlet port 27 is connected to return channel 157 by a channel 176 and its exit port 26 is connected to drain channel 169 by a channel 177, and that drain channel 168 is connected to spring chamber 29.

Figure 7:
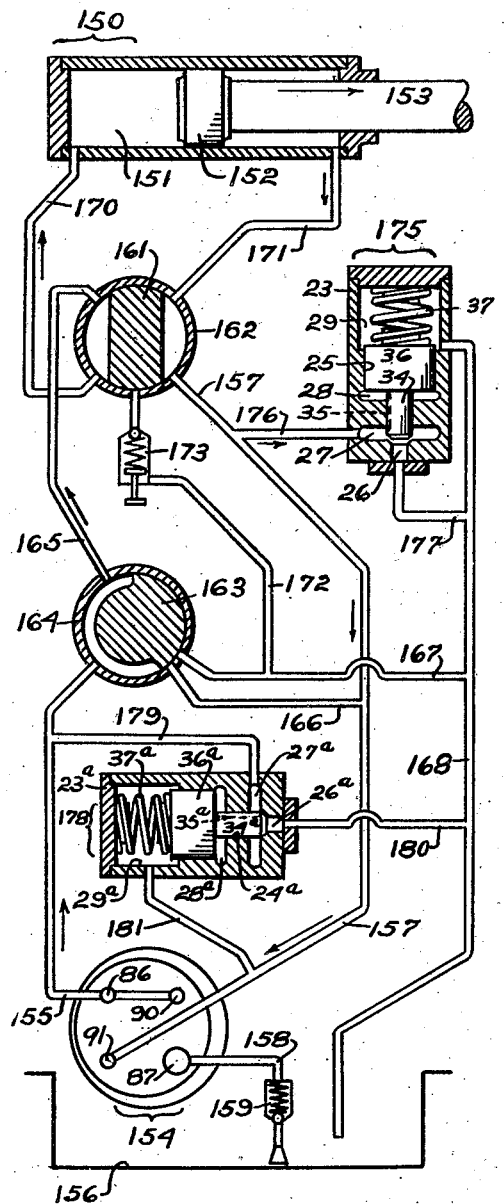
Fig. 7 is a diagram of the hydraulic circuit of a transmission which includes a non-reversible differential pump and a differential motor, the several parts being shown in the positions occupied during the working stroke of the motor.

When pump 154 is in operation and valves 161 and 163 are in the positions shown in Fig. 7, the entire output of pump 154 will flow through channel 155, valve casing 164, channel 165, valve casing 162 and channel 170 to the head end of cylinder 151 and move piston 152 forward on a working stroke at a rate proportional to the rate of pump delivery.

Piston 152 will eject liquid from the rod or gland end of cylinder 151 at a rate greater than the rate at which liquid can be received by the front row of cylinders in pump 154. The volume expelled from cylinder 151 in excess of the volume that can be received by the front row of cylinders is exhausted through anti-jump valve 175 which maintains a predetermined back pressure in motor 150 during normal operation and causes a very high back pressure to be created in response to any tendency of piston 152 to jump forward as previously explained.

In order to limit the pressure created by pump 154 and to prevent motor 150 from being operated under a load greater than its rated capacity, the transmission is provided with a relief valve 178 which is constructed and functions in the same manner as relief valve 41. Consequently, like parts of valves 41 and 178 have been indicated by like reference numerals and no further description thereof will be given, it being deemed sufficient to state that valve 178 has its inlet port 27ᵃ connected by a channel 179 to pressure channel 155, its exit port 26ᵃ connected by a channel 180 to drain channel 168 and its spring chamber 29ᵃ connected by a channel 181 to the return channel 157.

Figure 8:
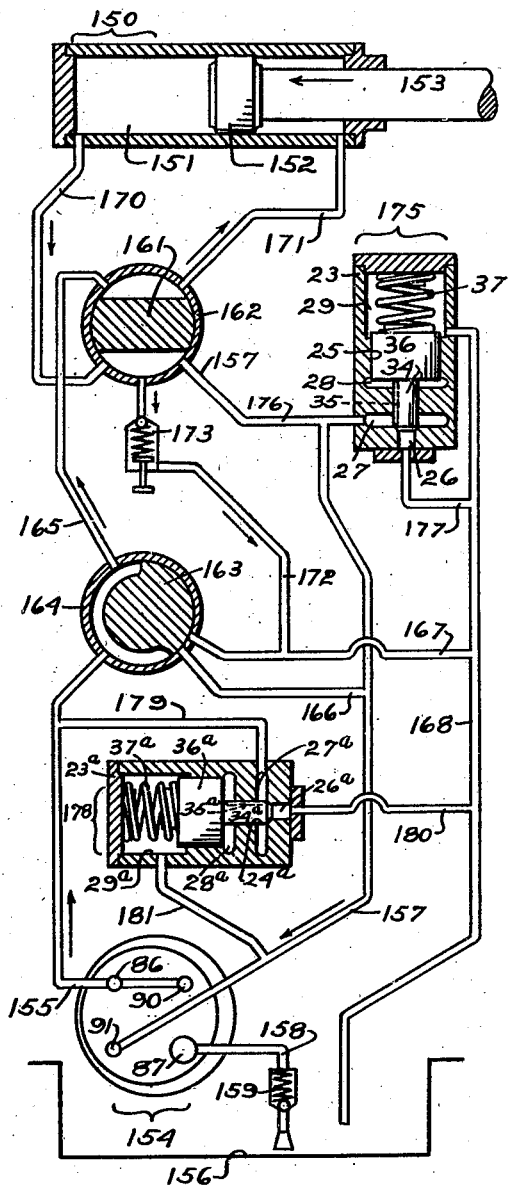
Fig. 8 is a view similar to Fig. 7 but showing the parts in the positions occupied during an idle or return stroke of the motor.
Figure 9:
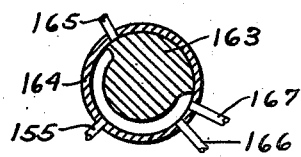
Fig. 9 is a view showing the start and stop valve illustrated in Figs. 7 and 8 shifted to a position to short circuit the pump and thereby stop the motor.

When reversing valve 161 is shifted to the position shown in Fig. 8, liquid from pump 154 will flow through channel 155, valve casing 164, channel 165, valve casing 162 and channel 171 to the rod end of cylinder 151 and move piston 152 rearward at high speed due to the displacement of rod 153. Piston 152 will eject liquid from the head end of cylinder 151 through channel 170 into valve casing 162. Enough of the expelled liquid to supply the front row of cylinders in pump 154 will flow thereto from casing 162 through channel 157 and the remainder will be exhausted through resistance valve 173 and channels 172, 167 and 168 into reservoir 156, resistance valve 173 maintaining a low pressure in channel 157 in order to insure complete filling of the front row of cylinders in pump 154.

When both a differential pump and a differential motor are employed in the same transmission, the piston rod of the motor may be so proportioned in respect to the pump that the volume of liquid exhausted through the anti-jump valve is so small that the resulting power loss is negligible.

For example, if all four rows of cylinders in pump 154 were of the same capacity and if the ratio between piston rod 153 and piston 152 were 2.9:4, during each revolution of its cylinder barrel pump 154 would receive one volume from cylinder 151, it would draw three volumes from reservoir 156 and deliver four volumes to cylinder 151, and piston 152 would expel from cylinder 151 1.1 volumes of which one volume would be delivered to pump 154 and only .1 volume would be exhausted through anti-jump valve 175.

The invention herein set forth is susceptible of various modifications and adaptations without departing from the scope thereof as hereafter claimed.

The invention is hereby claimed as follows:

1. A differential hydraulic transmission, comprising a hydraulic motor, a pump, a first fluid channel for directing the entire output of said pump to said motor to drive the same, a second fluid channel for directing liquid discharged from said motor to the intake of said pump, said motor and pump being so constructed that upon being operated in at least one direction by the output of said pump said motor will discharge liquid at a rate in excess of the rate said pump can receive liquid from said motor, and a self-adjusting orifice choke connected to said second channel to permit liquid to escape therefrom and to maintain a back pressure in said motor, said choke having means for momentarily delaying the adjustment thereof.

2. A hydraulic transmission, comprising a hydraulic motor, a pump, a first fluid channel for directing the entire output of said pump to said motor to drive the same, a second fluid channel for directing liquid discharged from said motor to the intake of said pump, said motor and pump being so constructed that said motor upon being operated in at least one direction by the output of said pump will discharge liquid at a rate in excess of the rate said pump can receive liquid from said motor, a self-adjusting orifice choke connected to said second channel to permit liquid to escape therefrom and to maintain a back pressure in said motor, a high pressure relief valve connected to said first channel to permit liquid to escape therefrom upon pump pressure exceeding a predetermined maximum, a spring normally holding said relief valve closed, and means for exerting upon said relief valve a force proportional to said back pressure to assist said spring in holding said valve closed whereby a drop in back pressure below a predetermined minimum will permit a lower pump pressure to open said relief valve.

3. A hydraulic transmission, comprising a hydraulic motor, a pump, a first fluid channel for directing the entire output of said pump to said motor to drive the same, a second fluid channel for directing liquid discharged from said motor to the intake of said pump, said motor and pump being so constructed that said motor upon being operated in at least one direction by the output of said pump will discharge liquid at a rate in excess of the rate said pump can receive liquid from said motor, a self-adjusting orifice choke connected to said second channel to permit liquid to escape therefrom and to maintain a back pressure in said motor, said choke having means for momentarily delaying the adjustment thereof, a high pressure relief valve connected to said first channel to permit liquid to escape therefrom upon pump pressure exceeding a predetermined maximum, a spring normally holding said relief valve closed, and means for exerting upon said relief valve a force proportional to said back pressure to assist said spring in holding said valve closed whereby a drop in back pressure below a predetermined minimum will permit a lower pump pressure to open said relief valve.

4. A hydraulic transmission, comprising a hydraulic motor, a pump, a first fluid channel for directing the entire output of said pump to said motor to drive the same, a second fluid channel for directing liquid discharged from said motor to the intake of said pump, said motor and pump being so constructed that said motor upon being operated in at least one direction by the output of said pump will discharge liquid at a rate in excess of the rate said pump can receive liquid from said motor, a valve casing having an inlet connected to said second channel and an outlet connected to an exhaust for permitting liquid discharged by said motor in excess of pump requirements to escape from said second channel, a valve fitted in said casing and urged toward said outlet by a substantially constant force to limit the rate of flow through said outlet and thereby cause a back pressure on said motor substantially equal to said constant force, a piston fixed to said valve and urged away from said outlet by said back pressure to hold said valve slightly open and thereby form a restricted orifice between said valve and the periphery of said outlet, and means for retarding the action of said liquid upon said piston to thereby delay the action of said valve in response to a variation in said back pressure.

5. A differential hydraulic transmission, comprising a hydraulic motor, a pump, a first fluid channel for directing the entire output of said pump to said motor to drive the same, a second fluid channel for directing liquid discharged from said motor to the intake of said pump, said motor and pump being so constructed that said motor upon being operated in at least one direction by the output of said pump will discharge liquid at a rate in excess of the rate said pump can receive liquid from said motor, a valve casing having an inlet connected to said second channel and an outlet connected to an exhaust for permitting liquid discharged by said motor in excess of pump requirements to escape from said second channel, a valve fitted in said casing and urged toward said outlet by a substantially constant force to limit the rate of flow through said outlet and thereby cause a back pressure on said motor substantially equal to said constant force, a piston fixed to said valve and urged away from said outlet by said back pressure to hold said valve slightly open and thereby form a restricted orifice between said valve and the periphery of said outlet, means for retarding the action of said liquid upon said piston to thereby delay the action of said valve in response to a variation in said back pressure, a high pressure relief valve connected to said first channel to permit liquid to escape therefrom upon pump pressure exceeding a predetermined maximum, a spring normally holding said relief valve closed, and means for exerting upon said relief valve a force proportional to said back pressure to assist said spring in holding said valve closed whereby a drop in back pressure below a predetermined minimum will permit a lower pump pressure to open said relief valve.

6. A differential hydraulic transmission, comprising a reciprocating hydraulic motor having a greater displacement or volumetric capacity in one end than in the other end thereof, a non-differential pump, a first fluid channel for directing the entire output of said pump to the small capacity end of said motor to operate said motor in one direction, a second fluid channel for directing liquid discharged from the large capacity end of said motor to the intake of said pump, a self-adjusting orifice choke connected to said second channel to permit liquid discharged by said motor in excess of pump requirements to be forced therethrough from said second channel and thereby maintain a back pressure on said motor, said choke having means for momentarily delaying the adjustment thereof, and means for reversing said motor.

7. A differential hydraulic transmission, comprising a reciprocating hydraulic motor having a greater displacement or volumetric capacity in one end than in the other end thereof, a non-differential pump, a first fluid channel for directing the entire output of said pump to the small capacity end of said motor to operate said motor in one direction, a second fluid channel for directing liquid discharged from the large capacity end of said motor to the intake of said pump, a self-adjusting orifice choke connected to said second channel to permit liquid discharged by said motor in excess of pump requirements to be forced therethrough from said second channel and thereby maintain a back pressure on said motor, said choke having means for momentarily delaying the adjustment thereof, and a valve connected between said channels and operable to connect one end or both ends of said motor to said first channel.

8. A differential hydraulic transmission, comprising a reciprocating hydraulic motor having a greater displacement or volumetric capacity in one end than in the other end thereof, a non-differential pump, a first fluid channel for directing the entire output of said pump to the small capacity end of said motor to operate said motor in one direction, a second fluid channel for directing liquid discharged from the large capacity end of said motor to the intake of said pump, a self-adjusting orifice choke connected to said second channel to permit liquid discharged by said motor in excess of pump requirements to be forced therethrough from said second channel and thereby maintain a back pressure on said motor, means for reversing said motor, a high pressure relief valve connected to said first channel for permitting the escape of liquid therefrom upon pump pressure exceeding a predetermined high value, and means for exerting upon said relief valve a force proportional to said back pressure to urge said relief valve to its closed position whereby a drop in back pressure below a predetermined minimum will permit a lower pump pressure to open said relief valve.

9. A differential hydraulic transmission, comprising a reciprocating hydraulic motor having a greater displacement or volumetric capacity in one end than in the other end thereof, a non-differential pump, a first fluid channel for directing the entire output of said pump to the small capacity end of said motor to operate said motor in one direction, a second fluid channel for directing liquid discharged from the large capacity end of said motor to the intake of said pump, a self-adjusting orifice choke connected to said second channel to permit liquid discharged by said motor in excess of pump requirements to be forced therethrough from said second channel and thereby maintain a back pressure on said motor, a valve connected between said channels and operable to connect one end or both ends of said motor to said first channel, a high pressure relief valve connected to said first channel for permitting the escape of liquid therefrom upon pump pressure exceeding a predetermined high value, and means for exerting upon said relief valve a force proportional to said back pressure to urge said relief valve to its closed position whereby a drop in back pressure below a predetermined minimum will permit a lower pump pressure to open said relief valve.

10. A differential hydraulic transmission, comprising a reciprocating hydraulic motor having a greater displacement or volumetric capacity in one end than in the other end thereof, a non-differential pump, a first fluid channel for directing the entire output of said pump to the small capacity end of said motor to operate said motor in one direction, a second fluid channel for directing liquid discharged from the large capacity end of said motor to the intake of said pump, a self-adjusting orifice choke connected to said second channel to permit liquid discharged by said motor in excess of pump requirements to be forced therethrough from said second channel and thereby maintain a back pressure on said motor, said choke having means for momentarily delaying the adjustment thereof, means for reversing said motor, a high pressure relief valve connected to said first channel for permitting the escape of liquid therefrom upon pump pressure exceeding a predetermined high value, and means for exerting upon said relief valve a force proportional to said back pressure to urge said relief valve to its closed position whereby a drop in back pressure below a predetermined minimum will permit a lower pump pressure to open said relief valve.

11. A differential hydraulic transmission, comprising a reciprocating hydraulic motor having a greater displacement or volumetric capacity in one end than in the other end thereof, a non-differential pump, a first fluid channel for directing the entire output of said pump to the small capacity end of said motor to operate said motor in one direction, a second fluid channel for directing liquid discharged from the large capacity end of said motor to the intake of said pump, a self-adjusting orifice choke connected to said second channel to permit liquid discharged by said motor in excess of pump requirements to be forced therethrough from said second channel and thereby maintain a back pressure on said motor, said choke having means for momentarily delaying the adjustment thereof, a valve connected between said channels and operable to connect one end or both ends of said motor to said first channel, a high pressure relief valve connected to said first channel for permitting the escape of liquid therefrom upon pump pressure exceeding a predetermined high value, and means for exerting upon said relief valve a force proportional to said back pressure to urge said relief valve to its closed position whereby a drop in back pressure below a predetermined minimum will permit a lower pump pressure to open said relief valve.

12. A differential hydraulic transmission, comprising a reciprocating hydraulic motor having a greater displacement or volumetric capacity in one end than in the other end thereof, a non-differential pump, a first fluid channel for directing the entire output of said pump to the small capacity end of said motor to operate said motor in one direction, a second fluid channel for directing liquid discharged from the large capacity end of said motor to the intake of said pump, a self-adjusting orifice choke connected to said second channel to permit liquid discharged by said motor in excess of pump requirements to be forced therethrough from said second channel and thereby maintain a back pressure on said motor, said choke having means for momentarily delaying the adjustment thereof, and a valve connected between said channels and operable to connect one end or both ends of said motor to said first channel and for short circuiting said pump.

13. A hydraulic transmission, comprising a hydraulic motor, a pump for supplying liquid to said motor to drive the same, and means for maintaining a back pressure upon said motor including a self-adjusting orifice choke through which liquid discharged by said motor is forced by said motor and which is provided with means for delaying its adjustment.

14. A hydraulic transmission, comprising a hydraulic motor, a pump for supplying liquid to said motor to drive the same, means for maintaining a back pressure upon said motor including a self-adjusting orifice choke through which liquid discharged by said motor is forced by said motor and which is provided with means for delaying its adjustment, a high pressure relief valve connected to the outlet of said pump for permitting the escape of liquid therethrough upon pump pressure exceeding a predetermined high value, and means for exerting upon said relief valve a force proportional to said back pressure to urge said relief valve to its closed position whereby a drop in back pressure below a predetermined minimum will permit a lower pump pressure to open said relief valve.

15. A differential hydraulic transmission, comprising a hydraulic motor, a multi-cylinder differential pump, a first fluid channel for directing the entire output of said pump to said motor to drive the same, a second fluid channel for directing liquid discharged from said motor to a part only of the cylinders of said pump, a third fluid channel for supplying the remainder of the pump cylinders with liquid from a suitable source, said pump being so constructed and connected that said motor upon being operated in at least one direction by the output of said pump will discharge liquid at a rate in excess of the rate said pump can receive liquid from said motor, and a self-adjusting orifice choke connected to said second channel to permit liquid to escape therefrom and to maintain a back pressure in said motor.

16. A differential hydraulic transmission, comprising a hydraulic motor, a multi-cylinder differential pump, a first fluid channel for directing the entire output of said pump to said motor to drive the same, a second fluid channel for directing liquid discharged from said motor to a part only of the cylinders of said pump, a third fluid channel for supplying the remainder of the pump cylinders with liquid from a suitable source, said pump being so constructed and connected that said motor upon being operated in at least one direction by the output of said pump will discharge liquid at a rate in excess of the rate said pump can receive liquid from said motor, and a self-adjusting orifice choke connected to said second channel to permit liquid to escape therefrom and to maintain a back pressure in said motor, said choke having means for momentarily delaying the adjustment thereof.

17. A differential hydraulic transmission, comprising a hydraulic motor, a multi-cylinder differential pump, a first fluid channel for directing the entire output of said pump to said motor to drive the same, a second fluid channel for directing liquid discharged from said motor to a part only of the cylinders of said pump, a third fluid channel for supplying the remainder of the pump cylinders with liquid from a suitable source, said pump being so constructed and connected that said motor upon being operated in at least one direction by the output of said pump will discharge liquid at a rate in excess of the rate said pump can receive liquid from said motor, a self-adjusting orifice choke connected to said second channel to permit liquid to escape therefrom and to maintain a back pressure in said motor, a high pressure relief valve connected to said first channel to permit liquid to escape therefrom upon pump pressure exceeding a predetermined maximum, a spring normally holding said relief valve closed, and means for exerting upon said relief valve a force proportional to said back pressure to assist said spring in holding said valve closed whereby a drop in back pressure below a predetermined minimum will permit a lower pump pressure to open said relief valve.

18. A differential hydraulic transmission, comprising a hydraulic motor, a multi-cylinder reversible differential pump, a first fluid channel for directing the entire output of said pump to said motor to drive the same, a second fluid channel for directing liquid discharged from said motor to a part only of the cylinders of said pump, a third fluid channel for supplying the remainder of the pump cylinders with liquid from a suitable source, said pump being so constructed and connected that said motor upon being operated in at least one direction by the output of said pump will discharge liquid at a rate in excess of the rate said pump can receive liquid from said motor, a self-adjusting orifice choke connected to said second channel to permit liquid to escape therefrom and to maintain a back pressure in said motor, means for reversing said pump, and means for connecting said third channel to a different group of cylinders.

19. A differential hydraulic transmission, comprising a hydraulic motor, a multi-cylinder differential pump, a first fluid channel for directing the entire output of said pump to said motor to drive the same, a second fluid channel for directing liquid discharged from said motor to a part only of the cylinders of said pump, a third fluid channel for supplying the remainder of the pump cylinders with liquid from a suitable source, said pump being so constructed and connected that said motor upon being operated in at least one direction by the output of said pump will discharge liquid at a rate in excess of the rate said pump can receive liquid from said motor, a self-adjusting orifice choke connected to said second channel to permit liquid to escape therefrom and to maintain a back pressure in said motor, means for reversing the direction of liquid flow, and means for connecting said orifice choke to the discharge side of said motor in either direction of motor actuation.

20. A differential hydraulic transmission, comprising a hydraulic motor, a multi-cylinder non-reversible differential pump, a first fluid channel for directing the entire output of said pump to said motor to drive the same, a second fluid channel for directing liquid discharged from said motor to a part only of the cylinders of said pump, a third fluid channel for supplying the remainder of the pump cylinders with liquid from a suitable source, said pump being so constructed and connected that said motor upon being operated in at least one direction by the output of said pump will discharge liquid at a rate in excess of the rate said pump can receive liquid from said motor, a self-adjusting orifice choke connected to said second channel to permit liquid to escape therefrom and to maintain a back pressure in said motor, said choke having means for momentarily delaying the adjustment thereof, and a valve for reversing the flow of liquid to and from said motor.

JAMES K. DOUGLAS.